US010970786B1

(12) United States Patent
Matheson et al.

(10) Patent No.: US 10,970,786 B1
(45) Date of Patent: Apr. 6, 2021

(54) RECOMMENDATION ENGINE FOR COST OF A CLAIM (71) Applicant: United Services Automobile Association (USAA), San Antonio, TX (US)

(72) Inventors: Cory Matheson, Celina, TX (US); Ramsey Devereaux, San Antonio, TX (US); Elliott William Kehoe, San Antonio, TX (US); Kristina Tomasetti, San Antonio, TX (US); Angelica Nichole White, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 149 days.

(21) Appl. No.: 15/815,399

(22) Filed: Nov. 16, 2017

Related U.S. Application Data (60) Provisional application No. 62/423,394, filed on Nov. 17, 2016.

(51) Int. Cl.
*G06Q 40/08* (2012.01)
*F24F 11/30* (2018.01)
*G05B 15/02* (2006.01)
*F24F 110/00* (2018.01)

(52) U.S. Cl.
CPC ............ *G06Q 40/08* (2013.01); *F24F 11/30* (2018.01); *F24F 2110/00* (2018.01); *G05B 15/02* (2013.01)

(58) Field of Classification Search
CPC ........ G06Q 40/08; G06Q 50/16; G06Q 10/10; G06Q 40/00; G06Q 30/0283; G06Q 40/02; G06Q 50/163; G06Q 50/22; G06Q 50/24; G06Q 10/06; G06Q 10/087; G06Q 30/02; G01C 21/3461; G06F 16/2379; G06F 16/256; G06F 16/9535; G07C 5/008
USPC .......... 705/4, 14.36, 35, 36 R, 50, 314, 400; 382/100, 106
See application file for complete search history.

(56) References Cited

U.S. PATENT DOCUMENTS

| 8,346,578 B1 * | 1/2013 | Hopkins, III | .......... G06Q 30/02 705/4 |
| 8,428,978 B1 * | 4/2013 | Smith | .................... G06Q 40/06 705/4 |
| 8,650,048 B1 * | 2/2014 | Hopkins, III | .......... G06Q 40/08 705/4 |
| 8,712,805 B1 * | 4/2014 | Ferries | ................... G06Q 40/08 705/4 |

(Continued)

*Primary Examiner* — Alexander G Kalinowski
*Assistant Examiner* — Sanjeev Malhotra
(74) *Attorney, Agent, or Firm* — Fish & Richardson P.C.

(57) ABSTRACT

Methods, systems, and apparatus, including computer programs encoded on computer storage media, for providing an estimate of cost of a claim to a homeowner. One of the methods includes receiving information about damage to a home of a homeowner. The method includes retrieving a home insurance policy associated with the homeowner and home insurance claims that have been submitted by other homeowners. The method also includes analyzing the information about the damage, the home insurance policy, and the home insurance claims to determine an estimate of cost of a claim that would cover the damage. In addition, the method includes providing the homeowner with the estimate of cost of the claim.

17 Claims, 5 Drawing Sheets

(56) References Cited

U.S. PATENT DOCUMENTS

| | | | |
|---|---|---|---|
| 8,719,134 B1* | 5/2014 | Huls | G06Q 30/0283 705/35 |
| 10,032,225 B1* | 7/2018 | Fox | G06Q 40/08 |
| 10,055,793 B1* | 8/2018 | Call | G06Q 30/0278 |
| 10,086,782 B1* | 10/2018 | Konrardy | B60W 30/0956 |
| 10,163,160 B1* | 12/2018 | Gaeta | G06Q 40/08 |
| 10,346,924 B1* | 7/2019 | Engelhorn | G06Q 40/08 |
| 2002/0035488 A1* | 3/2002 | Aquila | G06Q 40/08 705/4 |
| 2002/0116254 A1* | 8/2002 | Stein | G06Q 50/163 705/314 |
| 2003/0040934 A1* | 2/2003 | Skidmore | G06Q 40/08 705/4 |
| 2003/0120519 A1* | 6/2003 | Candos | G06Q 40/02 705/4 |
| 2004/0243450 A1* | 12/2004 | Bernard, Jr. | G06Q 40/02 705/4 |
| 2007/0288269 A1* | 12/2007 | McLemore | G06Q 40/08 705/4 |
| 2008/0114655 A1* | 5/2008 | Skidmore | G06Q 10/10 705/14.36 |
| 2010/0042442 A1* | 2/2010 | Seitomer | G06Q 40/00 705/4 |
| 2010/0161515 A1* | 6/2010 | Catania | G06Q 10/087 705/400 |
| 2011/0196707 A1* | 8/2011 | Danico | G06Q 40/08 705/4 |
| 2012/0095788 A1* | 4/2012 | Simpson | G06Q 40/08 705/4 |
| 2012/0290333 A1* | 11/2012 | Birchall | G06Q 40/08 705/4 |
| 2013/0144658 A1* | 6/2013 | Schnabolk | G06Q 40/00 705/4 |
| 2013/0290033 A1* | 10/2013 | Reeser | G06Q 10/10 705/4 |
| 2014/0257864 A1* | 9/2014 | Billman | G06Q 40/08 705/4 |
| 2014/0278573 A1* | 9/2014 | Cook | H04L 67/16 705/4 |
| 2014/0310028 A1* | 10/2014 | Christensen | G06Q 40/00 705/4 |
| 2015/0032480 A1* | 1/2015 | Blackhurst | G06Q 40/08 705/4 |
| 2015/0088556 A1* | 3/2015 | Convery | G06Q 40/08 705/4 |
| 2015/0154709 A1* | 6/2015 | Cook | G06Q 30/0281 705/4 |
| 2015/0154712 A1* | 6/2015 | Cook | G06Q 40/08 705/4 |
| 2015/0235322 A1* | 8/2015 | Emison | G06Q 40/08 705/4 |
| 2015/0317741 A1* | 11/2015 | Muxfeld | G06Q 40/08 705/4 |
| 2015/0356686 A1* | 12/2015 | Cook | G06Q 40/08 705/4 |
| 2016/0012546 A1* | 1/2016 | Fields | G06Q 30/0201 705/4 |
| 2016/0055588 A1* | 2/2016 | Keenan | G06Q 40/08 705/4 |
| 2016/0055594 A1* | 2/2016 | Emison | G06Q 40/08 705/4 |
| 2016/0104250 A1* | 4/2016 | Allen | G06Q 40/08 705/50 |
| 2016/0260175 A1* | 9/2016 | Rogers | G06Q 40/08 |
| 2017/0024826 A1* | 1/2017 | Blessman | G06Q 40/08 |
| 2017/0032466 A1* | 2/2017 | Feldman | G06F 16/248 |
| 2017/0345069 A1* | 11/2017 | Labrie | G06Q 40/08 |
| 2017/0365008 A1* | 12/2017 | Schreier | G06Q 50/16 |
| 2018/0047106 A1* | 2/2018 | Snyder | G06Q 30/0645 |
| 2018/0068393 A1* | 3/2018 | Stepeck | G06Q 40/08 |
| 2018/0089764 A1* | 3/2018 | Busque | G01C 21/36 |
| 2018/0189890 A1* | 7/2018 | Bui | G06Q 40/08 |
| 2018/0268489 A1* | 9/2018 | McDonnell | G06Q 40/08 |
| 2019/0087907 A1* | 3/2019 | Sale | G06F 16/2379 |
| 2019/0114717 A1* | 4/2019 | Labrie | G06K 9/6212 |

* cited by examiner

RECOMMENDATION ENGINE FOR COST OF A CLAIM

CROSS-REFERENCE TO RELATED APPLICATION

This application claims priority to U.S. Provisional Application Ser. No. 62/423,394, filed on Nov. 17, 2016. The disclosure of the prior application is considered part of and is incorporated by reference in the disclosure of this application.

BACKGROUND

Home insurance, or homeowners insurance, is an insurance policy that protects against losses occurring to one's home and its contents. The homeowners insurance can help to cover the cost of replacing or repairing the home in various events such as fire, theft, vandalism, or weather-related events. After the damage occurs, the homeowner can file a claim with an insurance company to receive a reimbursement for repair or replacement costs. However, in general, home insurance policies do not require the homeowners to file a claim when damage occurs, and in many cases, it is advantageous for the homeowner to not make a claim. As a result, homeowners are often faced with the challenge of determining whether or not to file a claim with an insurance company.

SUMMARY

In general, one innovative aspect of the subject matter described in this specification can be embodied in methods that include the actions of receiving information about damage to a home of a homeowner. The methods include the actions of retrieving a home insurance policy associated with the homeowner and home insurance claims that have been submitted by other homeowners. The methods include the actions of analyzing the information about the damage, the home insurance policy, and the home insurance claims to determine an estimate of cost of a claim that would cover the damage. The methods include the actions of providing the homeowner with the estimate of cost of the claim.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The information about the damage may be automatically received from at least one smart home device installed at the home of the homeowner. The at least one smart home device may include a thermostat, a smoke detector, or a water sensor. The at least one smart home device may have Wi-Fi capabilities. The information about the damage may be received from the homeowner through a website or an application. The information about the damage may include at least one of a description of the damage, a video, a picture, or a document related to the damage. The methods may include the actions of retrieving a claim record of the homeowner; determining an impact of the claim on the home insurance policy based on the home insurance policy, the home insurance claims, and the claim record; and providing the determined impact of the claim to the homeowner. An impact of the claim on the home insurance policy may include one of an increase in an insurance premium or a cancelation of the home insurance policy. The methods may include the actions of providing a recommendation to the homeowner, in which the recommendation may include at least one of an instruction to repair the damage or a list of contractors that the homeowner may hire to repair the damage. The estimate of cost of the claim may include an out of pocket cost.

Particular embodiments of the subject matter described in this specification can be implemented so as to realize one or more of the following advantages. By implementing a recommendation engine that can automatically analyze damage information received from various data sources and provide homeowners with an estimate of cost of a claim as well as impacts of filing a claims before the homeowners actually files a claim, computerized systems described in this specification can significantly reduce the number of claims that needs to be processed by the systems, as the homeowners are better informed and only file claims when it is advantageous to do so. In addition, the recommendation engine can automatically receive damage information from data sources rather than the homeowners, for example, from smart home devices, thereby reducing the need for extensive user input while providing an improved customer experience using the systems. Thus, implementations of the claimed subject matter can significantly reduce the amount of resources consumed by the computerized systems (e.g., by reducing storage space and computational costs required to store and process unnecessary claim documents and reducing the network traffic between homeowners' client devices and other devices in the computerized systems) while maintaining high performance of the systems (e.g., providing high customer satisfaction as the homeowners are better informed to make a decision on whether or not to file a claim, and saving customer time by eliminating unnecessary claim processes).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Home insurance, or homeowners insurance, is an insurance policy that protects against losses occurring to one's home and its contents. The homeowners insurance can help to cover the cost of replacing or repairing the home in various events such as fire, theft, vandalism, or weather-related events. After the damage occurs, the homeowner can file a claim with an insurance company to receive a reimbursement for repair and/or replacement costs. However, in general, home insurance policies do not require homeowners to file a claim when damage occurs, and in many cases, it is advantageous for the homeowners to not make a claim. As a result, homeowners are often faced with the challenge of determining whether or not to file a claim with an insurance company.

This specification describes systems and methods that allow a homeowner to determine an estimate of cost of a claim and impacts of filing the claim to the homeowner's insurance policy before the homeowner actually files the claim. The systems can further provide recommendations to the homeowner for repairing and/or replacing the home after damage. Based on the estimated cost, impacts, and recommendations, the homeowner can make a decision on whether or not to file the claim and know which actions should be taken to repair the damage in a timely and cost-effective manner. By informing homeowners of the impacts of filing a claim and the costs associated with filing the claim, the systems and methods described herein can significantly save insurance companies and homeowners time and money as the homeowners only file a claim when it is advantageous to do so. Further, the system and methods can enable the insurance companies and the homeowners to interact with each other on a more frequent basis, and thus strengthen the relationship between insurance companies and homeowners.

By implementing a recommendation engine that can automatically analyze damage information received from various data sources and provide homeowners with an estimate of cost of a claim as well as impacts of filing a claims before the homeowners actually files a claim, the systems described herein can significantly reduce the number of claims that needs to be processed by the systems, as the homeowners are better informed and only file claims when it is advantageous to do so. In addition, the recommendation engine can automatically receive damage information from data sources rather than the homeowners, for example, from smart home devices, thereby reducing the need for extensive user input while providing an improved customer experience using the systems. Thus, implementations of the claimed subject matter can significantly reduce the amount of resources consumed by the systems (e.g., reducing storage space and computational costs required to store and process unnecessary claim documents) while maintaining high performance of the systems (e.g., providing high customer satisfaction as the homeowners are better informed to make a decision on whether or not to file a claim, and saving customer time by eliminating unnecessary claim processes).

Figure 1:
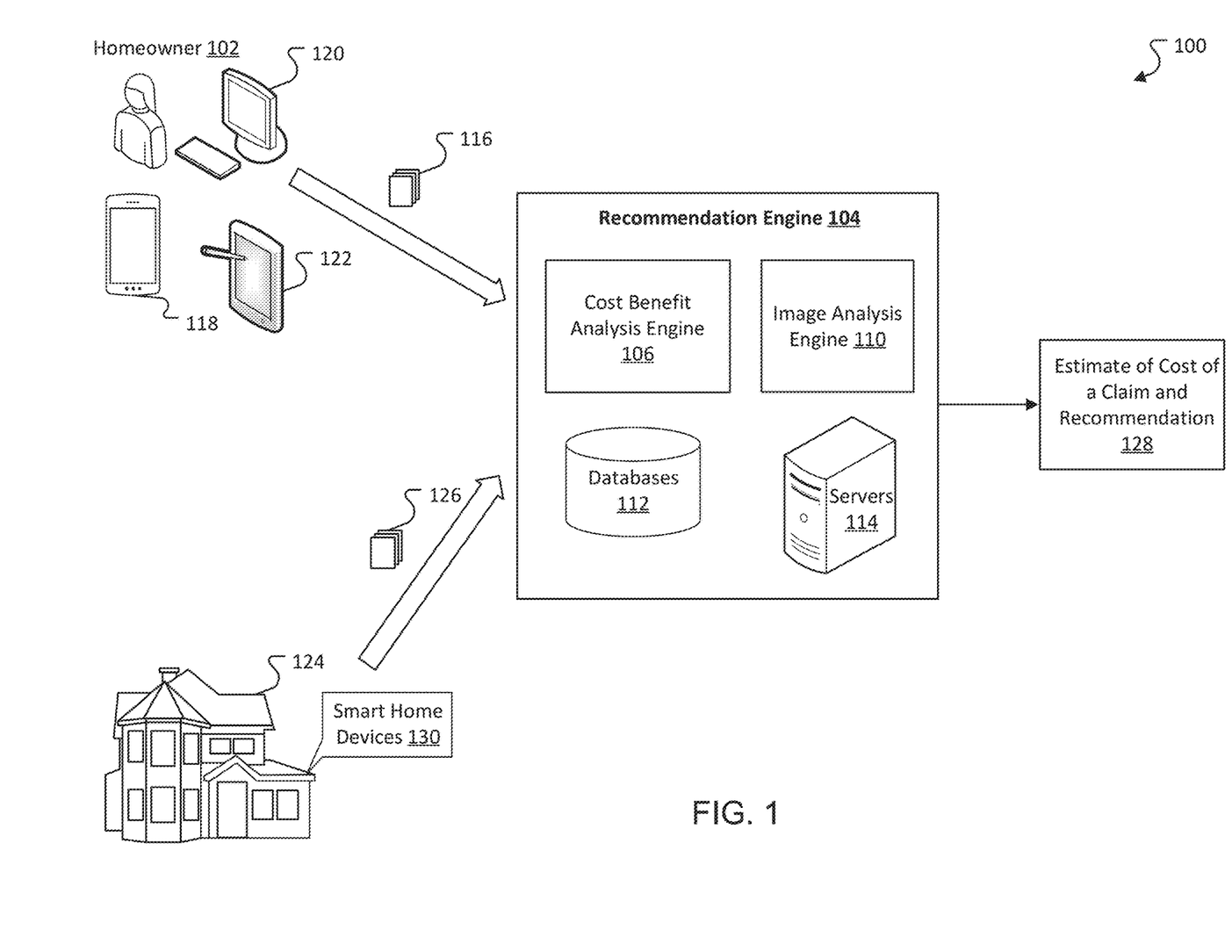
FIG. 1 illustrates an example of an environment for providing an estimate of cost of a claim and recommendation to a homeowner.

FIG. 1 illustrates an example of an environment for providing an estimate of cost of a claim and recommendations to a homeowner. The environment can include a recommendation engine 104. The recommendation engine 104 can include a server system 114 and databases 112. The recommendation engine 104 can further include a cost benefit analysis engine 106 and an image analysis engine 110. The server system 114 may include one or more servers coupled to the Internet or other computer network. The databases 112, the cost benefit analysis engine 106, and the image analysis engine 110 may reside at the server system 114. The server system 114 may be located at an organization (e.g., an insurance company) or distributed across the Internet or other computer network. The databases 112 may store data/information about home insurance policies that homeowners have with an insurance company. The databases 112 may store detailed construction of the homes (e.g., types of roofs, wall materials, types of kitchen upgrades, etc.). The databases 112 may store historical data including data about various home insurance claims previously submitted by homeowners (which may or may not include the homeowner 102), data about the costs associated with these home insurance claims, and impacts of each homeowners claim on the corresponding insurance policy.

After a loss or damage, a homeowner (e.g., homeowner 102) who holds a home insurance policy provided by an insurance company or other entity may want to file a claim with the insurance company to have the repair or replacement costs covered. However, as the homeowner 102 is not mandated to make a claim, and in many cases, it may be advantageous for the homeowner 102 to not make the claim, the homeowner 102 needs to decide whether or not to make the claim. For example, if the repair or replacement costs do not exceed the deductible amount specified in the home insurance policy, the homeowner 102 should not file the claim. This is because the homeowner 102 will not receive any reimbursement from the insurance company, but the claim is still noted in the homeowner 102's claim record and may put the homeowner 102 in a higher risk category, which may result in a higher premium.

In order to help the homeowner 102 to make a decision on whether or not to file the claim, the recommendation engine 104 can collect information about the damage (or loss) from the homeowner 102, analyze the information, retrieve the insurance policy associated with the homeowner 102 and other relevant information, and perform cost benefit analysis in order to determine an estimate of cost of the claim and its impacts. The recommendation engine 104 can collect information about the damage to a home 124 from the homeowner 102 through different channels. In some implementations, the recommendation engine 104 can provide a website (or a mobile application) for the homeowner 102 to fill out a request for an estimate of cost of a claim. The homeowner 102 can use a computing device such as a desktop 120 to access the website. When filling out the request, the homeowner 102 can provide a description of the damage and upload one or more relevant documents to the website. For instance, the homeowner can upload a picture 116 of a hole in the wall or water damage in the kitchen. In some implementations, the homeowner can take the picture and/or video 116 using a mobile phone 118 or a tablet device 122 and upload the picture and/or video 116 to the website using the mobile phone 118 or the tablet device 122. In some implementations, the recommendation engine 104 can provide an interactive voice response (IVR) system that allows a homeowner to report damage and loss through the use of voice and telephone keypad. The IVR system can automatically record the homeowner's speech, and respond with prerecorded or dynamically generated audio to further direct the homeowner to provide more information about the damage.

In some implementations, the home 124 of the homeowner 102 can be equipped with smart home devices 130 (or connected devices). For example, the smart home devices 130 can include a smart thermostat, a smoke detector, a water sensor, and/or other device. Since the devices 130 have sensor and ability to connect to the Internet, the devices 130 can detect damage to the home 124 and automatically notify the homeowner of such damage, even when the damage is not visible to the homeowner. The devices 130 can be programmed to automatically send information about the damage to the recommendation engine 104. As an example, a water sensor can detect water leaking in the bathroom, notify the homeowner, and send information 126 about the water leaking to the recommendation engine 104. In another example, the water sensor can detect that water is running behind the wall in the living room and causing damage to the wall, although the homeowner can only visually see a stain on the wall. The water sensor can be programmed to automatically notify the homeowner of the water damage and automatically send information about the damage to the recommendation engine 104. The water sensor and other connected devices in the home can even act on behalf of the homeowner. For example, the water sensor can detect a problem inside the home, and through machine learning, the water sensor knows that it should trigger a shutoff of the home's water line and take other actions on behalf of the homeowner in response to the problem.

After receiving information about the damage from the homeowner and/or the home, the recommendation engine 104 can analyze the received information to obtain damage data associated with the damage. For example, after the homeowner uploads an image of the damage (e.g., an image of a hole on the wall) to a mobile application or a website, the image analysis engine 110 can extract and/or derive meaningful information from the image using digital image processing techniques. In particular, the image analysis engine 110 can automatically detect one or more objects in the image, e.g., detecting the hole on the wall, by using object recognition techniques. As an example, the engine 110 can recognize objects using a machine learning model that employs one or more neural network layers configured to process an input (e.g., an image or features extracted from an image) and to generate an output for the input. For instance, the machine learning model is configured to process the above image of the damage and to generate an estimated probability (e.g., 90%) that the image includes an image of a hole. In addition, the image analysis engine 110 can determine that the hole has a diameter of 2.5 inches. The output of the image analysis engine 110 can transform analysis results (e.g., 2.5 inch hole) into damage data. The image analysis engine 110 can then transmit the damage data to the cost benefit analysis engine 106.

Subsequently, the cost benefit analysis engine 106 may retrieve the insurance policy associated with the homeowner 102 and other relevant data/information (e.g., detailed construction of the home) from the databases 112. The engine 106 may also retrieve relevant historical data from the databases 112 including data about homeowners claims previously submitted by the homeowner 102, data about homeowner claims previously submitted by other homeowners regarding similar damage, data about costs associated with these homeowners claims, and impacts of each homeowners claim on a corresponding insurance policy. The engine 106 may aggregate all or part of the data received/retrieved from the homeowner 102, the home 124, and the databases 112, and then perform cost benefit analysis based on the aggregated data in order to determine an estimated cost of the claim for the homeowner 102 and its impacts on the insurance policy. The engine 106 may then provide an estimate of cost of a claim and recommendation 128 to the homeowner 102 regarding whether or not to file a claim and how to repair the damage.

In particular, the engine 106 may first determine an estimate of a repair (or replacement) cost for the homeowner 102 based on repair or replacement costs listed in home insurance claims that were previously submitted by other homeowners who had a similar insurance policy as the homeowner 102 and claimed for similar damage. The engine 106 may further consider different factors including, but not limited to, location of the home 124, construction of the home 124, and timing of the repair or replacement to obtain a more accurate estimate. As an example, if the home is located in New York, the repair cost may be higher than in Texas. In another example, if the home has been renovated recently, the repair cost may be lower. The engine 106 may compute the repair cost at different times and then provide the homeowner 102 with the different costs. For example, the engine 106 may suggest that the repair cost is lower if the homeowner 102 waits two weeks to get the repair started. However, the engine 106 may warn that the damage may be worst after two weeks and the homeowner 102 may need to pay more if the homeowner 102 waits until then. After estimating the repair cost, the engine 106 may compute an out of pocket cost that the homeowner 102 needs to pay if the homeowner 102 files a claim based on a deductible amount listed in the home insurance policy associated with the homeowner 102. If the repair cost is less than the deductible amount, the engine 106 can automatically determine that the cost of claim is equal to the repair cost. If the repair cost is higher than the deductible amount, the engine 106 can automatically determine that the out of pocket cost is equal to the deductible amount. That means if the homeowner 102 files a claim, the homeowner 102 would need to pay out of pocket an amount equal to the deductible amount, and the insurance company would pay the remaining cost. In addition, the engine 106 may provide the homeowner 102 with a repair or replacement cost that the homeowner 102 needs to pay if the homeowner 102 does not file a claim.

The engine 106 may recommend the homeowner 102 on whether or not filing a claim. For example, when the repair cost is less than the deductible amount, the engine 106 may recommend the homeowner 102 not filing the claim because the homeowner 102 would not receive any reimbursement from the insurance company but the claim is still added to a claim record of the homeowner 102. When the repair cost is higher than the deductible amount, the engine 106 may determine an impact of the claim on the home insurance policy of the homeowner 102. Based on the determined impact, the engine 106 may recommend the homeowner 102 filing or not filing the claim. The engine 106 may determine the impact based on information such as a claim record of the homeowner 102, insurance policy of the homeowner 102, and historical data about impacts of homeowners claims made by other homeowners on corresponding insurance policies. This information and data can be retrieved from the databases 112. An impact of a claim may include an increase in the insurance premium or a cancelation of the home insurance policy depending on the insurance company that provides the insurance policy. Different insurance companies may have different thresholds for a number of claims that triggers an increase in a premium or cancelation of an insurance policy. For example, some insurance companies may cancel an insurance policy if a homeowner files two claims in three years or three claims in five years. If the insurance company that provides the insurance policy for the homeowner 102 is one of these companies, and the claim is the second claim of the homeowner 102 in three years, the engine 106 may determine that the impact of the claim is a cancelation of the policy. In this scenario, the engine 106 may recommend the homeowner 102 not filing a claim. Instead, the engine 106 may recommend the homeowner 102 to repair the damage by himself or herself. For example, the engine 106 may provide a link to a website that has an instruction on how to repair the damage. The engine 106 may also provide an estimate of cost of repair if the homeowner 102 does it by himself or herself. Alternatively, or additionally, the engine 106 may recommend the homeowner 102 to hire a contractor by providing the homeowner 102 with a list of contractors and a cost for hiring each contractor.

Figure 2:
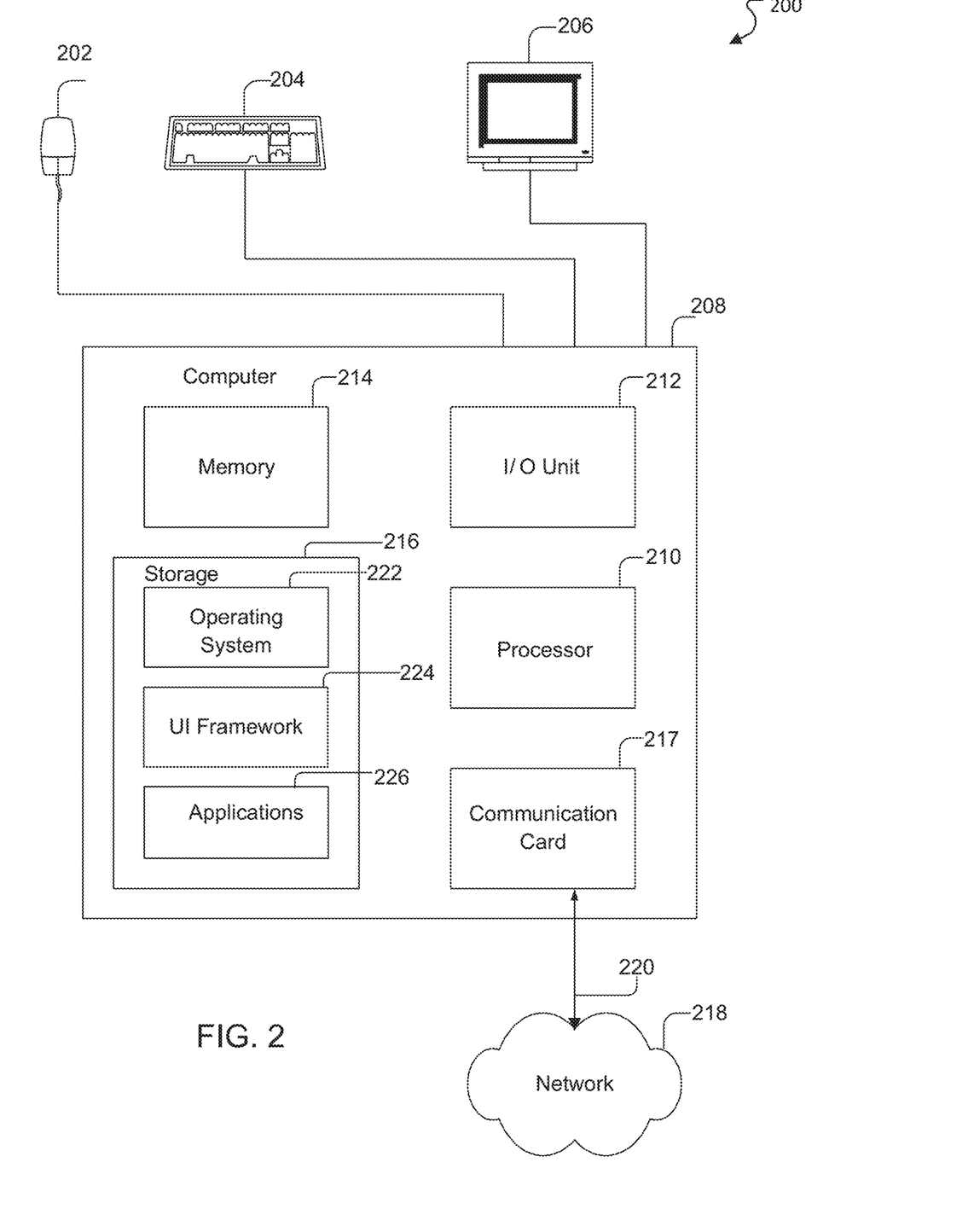
FIG. 2 illustrates an example of a simplified system architecture for providing an estimate of cost of a claim and recommendation to a homeowner.

FIG. 2 illustrates an example of an architecture of a computing system 200 suitable for implementing the recommendation engine 104 of FIG. 1. The computing system 200 includes input/output (I/O) devices, such as mouse 202, keyboard 204, and display 206, and a central processing unit (CPU) 208. CPU 208 includes a processor 210, an I/O unit 212, memory 214, storage 216, and communications card 217 (e.g., a modem or a network adapter) for exchanging data with a network 218 via a communications link 220 (e.g., a telephone line, a wireless network link, or a cable network). The network 218 can be provided by an internal network service available within an organization. Alternatively or additionally, the network 218 can include an external network(s) that is available via the Internet or other networked services (e.g., a cloud computing service, a data center, or other remotely accessible medium outside of an organization's internal network). System 200 may be implemented as, for example, a personal computer, a workstation, a server, a cellular telephone, or a personal digital assistant.

Storage 216 stores data and various programs such as an operating system (OS) 222. The OS 222 is a program that controls the functionality and interaction of the hardware components of the computing system 200 and that facilitates the operation of other programs executing on the CPU 208. Windows Me, Windows XP, Linux, and MacOS are examples of common operating systems for personal computers. Windows CE or Windows Embedded are examples of common embedded operating systems used in cellular telephones or personal digital assistants. Examples of programs include the cost benefit analysis engine 106 and the image analysis engine 110 of FIG. 1.

Storage 216 also stores a UI framework 224 and applications 226. The UI framework 224 is a collection of code that implements user interfaces and associated logic for applications 226 running on the CPU 208. For example, the UI framework can be used to generate a website or application that the homeowner 102 may use to interact with the recommendation engine 104 (e.g., the homeowner 102 may request for an estimate of cost of a claim through the user interface). An example of the user interface is illustrated in FIG. 3 and FIG. 4.

In general, the UI framework 224 resides between the applications 226 and the OS 222. In other words, applications 226 interact with the UI framework 224 to initiate UI functions, and then the UI framework 224 calls routines of the OS 222 to implement the initiated UI functions. A user of the computing system 200 may interact with applications 226 running on the CPU 208 through UIs by using I/O devices such as, for example, mouse 202, keyboard 204, and display 206.

The computing system 200 of FIG. 2 is merely one example of a computing system for implementing the systems, methods, and techniques described herein. Other computing systems may be used to implement these systems, methods, and techniques.

Figure 3:
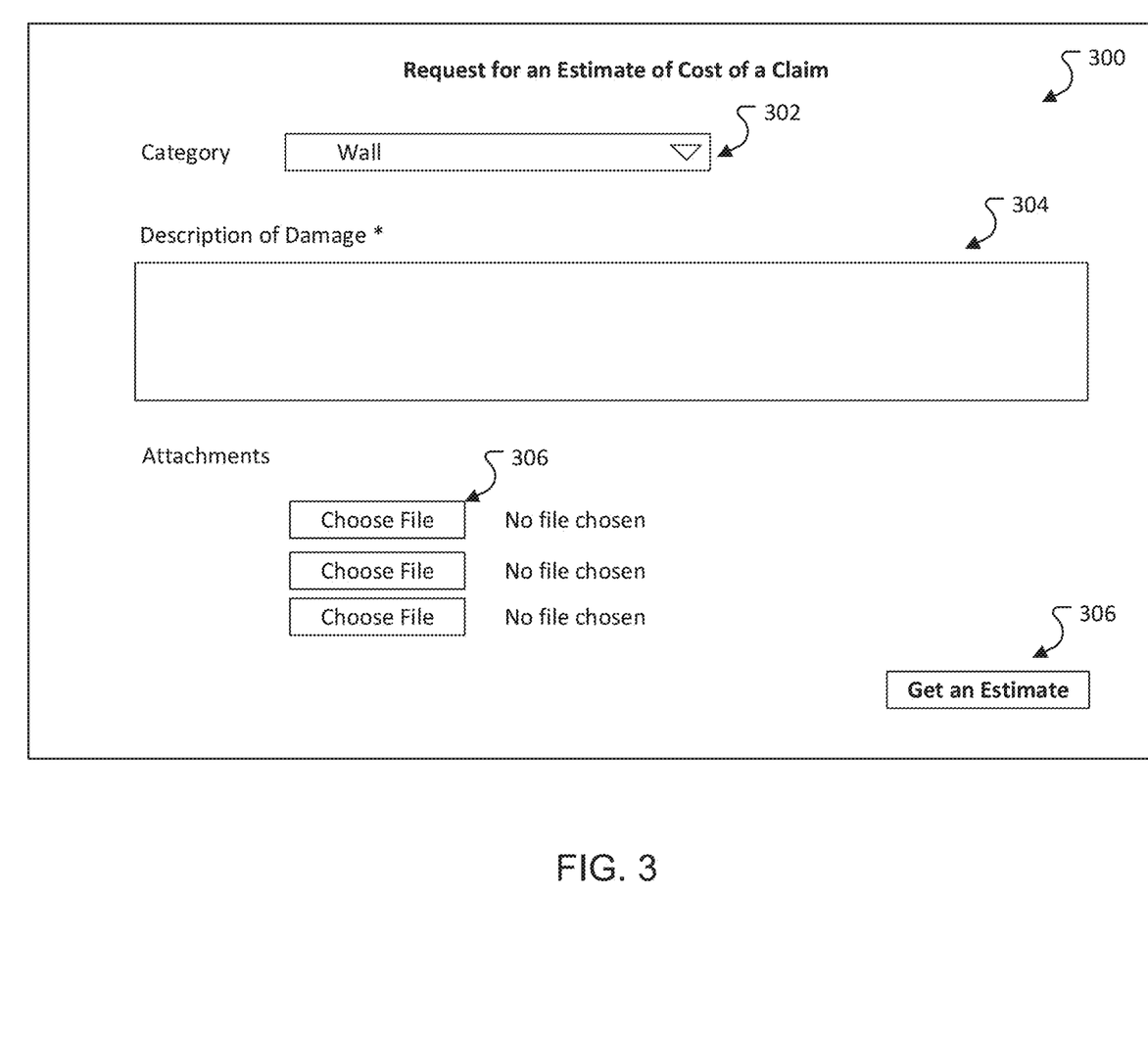
FIG. 3 and FIG. 4 illustrate simplified example screenshots of a website or an application for a homeowner to request an estimate of cost of a claim and to receive the estimate and recommendation.
Figure 4:
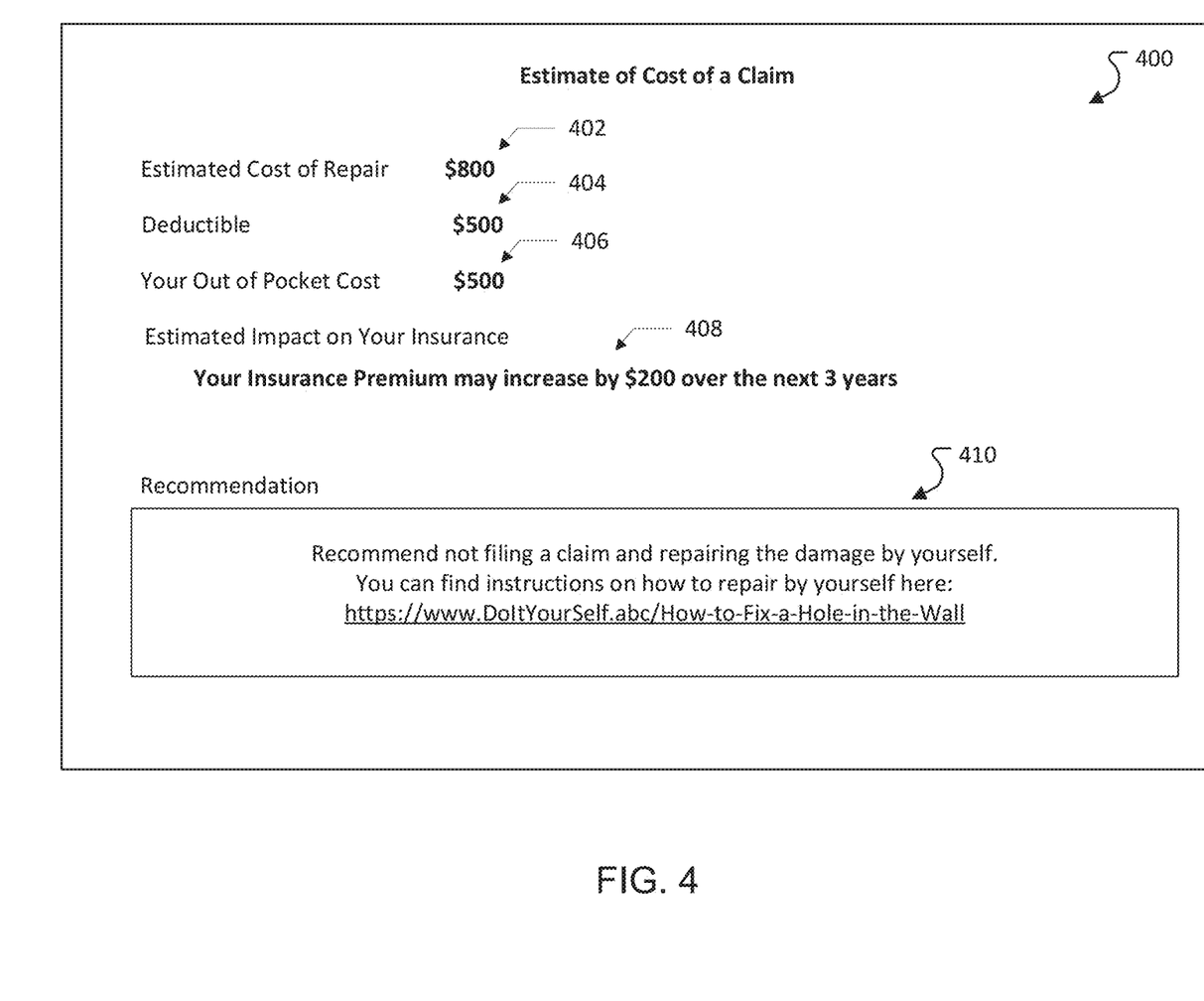

FIG. 3 and FIG. 4 illustrate simplified example screenshots of a website or an application that the homeowner 102 may use to request an estimate of cost of a claim and to receive the estimate and recommendation from the recommendation engine 104. In particular, FIG. 3 shows an example screenshot of a webpage 400 that the homeowner 102 uses to request an estimate of cost of a claim. The homeowner 102 may first select a category 302 of damage including, but not limited to, wall, roof, appliance, doors, stairs, plumbing, or lighting. The homeowner 102 may then provide a description 304 of the damage such as "There is a hole in the kitchen wall. The hole has a diameter of about 3 inches." The homeowner 102 may attach one or more attachments 306 related to the damage. The attachments 306 may include images, videos, or documents that further illustrate or describe the damage. The attachments 306 can be uploaded from a computing device of the homeowner 102 such as the mobile phone 118 or tablet device 122. After filling out information about the damage, the homeowner 102 may click on "Get an Estimate" button 306 to obtain an estimate of cost of a claim.

As shown in FIG. 4, the homeowner 102 is then directed to a webpage 400 that displays an estimate of cost of a claim and recommendation to the homeowner 102. In particular, the webpage 400 may show an estimated cost of repair 402, a deductible amount 404, and an out of pocket cost 406 that the homeowner 102 needs to pay for the repair or replacement. In this example screenshot, the estimated cost of repair is $800 and the deductible amount is $500. Because the estimated cost of repair is less than the deductible amount, the out of pocket cost is equal to the deductible amount which is $500. The webpage 400 may further display an estimated impact 408 on the insurance policy of the homeowner 102. As explained above, the impact may include an increase in an insurance premium, a cancelation of an insurance policy, or other impacts. In this example, the impact is that the insurance premium may increase by $200 over the next three years if the homeowner 102 files the claim. The webpage 400 may also display a recommendation 410 to the homeowner 102 that includes a recommendation on whether or not to file the claim and how to repair the damage. For example, as shown in FIG. 4, the recommendation 410 is:

"Recommend not filing a claim and repairing the damage by yourself.

You can find an instruction on how to repair by yourself here:

https://www.DoItYourSelf.abc/How-to-Fix-a-Hole-in-the-Wall"

The recommendation 410 may include an estimate of cost of repair if the homeowner 102 does the repair by himself or herself by following the instruction. Alternatively, or additionally, the recommendation 410 may include a list of contractors that the homeowner 102 can hire to get the repair done and a cost for hiring each contractor.

Figure 5:
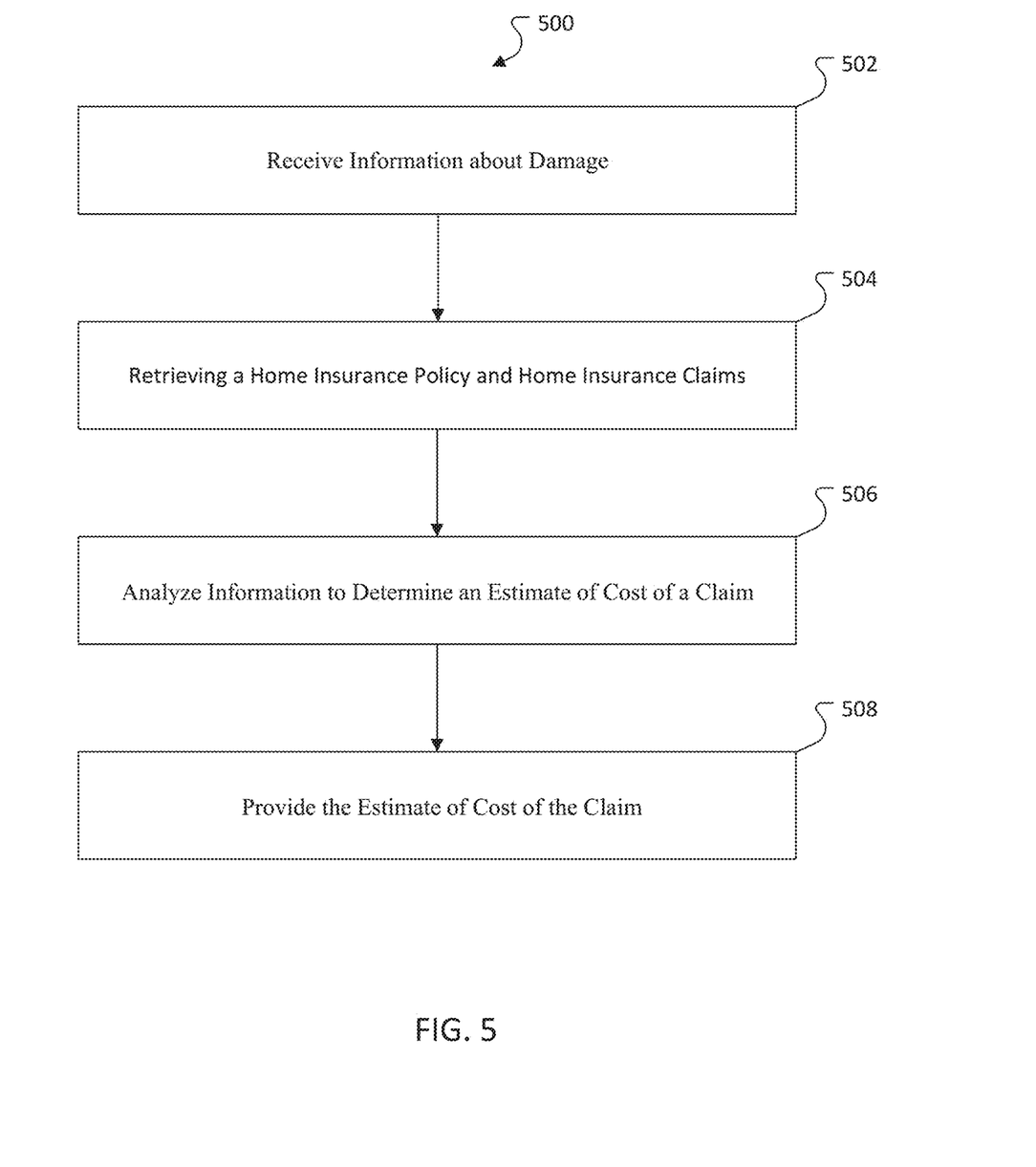
FIG. 5 illustrates a flowchart of an exemplary process for providing an estimate of cost of a claim and recommendation to a homeowner.

FIG. 5 illustrates a flowchart of an exemplary process for providing an estimate of cost of a claim and recommendation to a homeowner. The process may be performed by one or more computer systems, for example, the computing system 200 of FIG. 2.

The process 500 includes receiving 502 information about damage to a home of a homeowner. For example, the information about the damage can be automatically received from at least one smart home device installed at the home of the homeowner. The at least one smart home device may include a thermostat, a smoke detector, or a water sensor. The at least one smart home device may have Wi-Fi capabilities. Further, the information about the damage can be received from the homeowner through a website or an application. The information about the damage may include at least one of a description of the damage, a video, a picture, or a document related to the damage. The process 500 includes retrieving 504 a home insurance policy associated with the homeowner and home insurance claims that have been submitted by other homeowners. The process 500 includes analyzing 506 the information about the damage, the home insurance policy, and the home insurance claims to determine an estimate of cost of a claim that would cover the damage. The process 500 includes providing 508 the homeowner with the estimate of cost of the claim. The estimate of cost of the claim may include an out of pocket cost.

The process 500 may further include retrieving a claim record of the homeowner; determining an impact of the claim on the home insurance policy based on the home insurance policy, the home insurance claims, and the claim record; and providing the determined impact of the claim to the homeowner. An impact of the claim on the home insurance policy may include one of an increase in an insurance premium or a cancelation of the home insurance policy. In addition, the process 500 may include providing a recommendation to the homeowner. The recommendation may include at least one of an instruction to repair the damage or a list of contractors that the homeowner may hire to repair the damage.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   one or more sensors of a smart home device that have wireless communication capabilities;
   at least one computer; and
   a computer-readable medium coupled to the at least one computer having instructions stored thereon which, when executed by the at least one computer, cause the at least one computer to perform operations comprising:
   receiving, through a wireless communication network, from the one or more sensors of the smart home device, an image associated with a home of a first homeowner;
   processing, using a machine learning model that includes one or more neural network layers, the image to automatically detect at least one object in the image that indicates a damage to the home and to generate damage data that specifies a severity of the damage;
   retrieving (i) a home insurance policy associated with the first homeowner and (ii) home insurance claims that were previously submitted by other homeowners;
   automatically estimating, from the damage data, from the home insurance policy associated with the first homeowner, and from the home insurance claims submitted by other homeowners, a cost that the first homeowner would be required to pay upon submitting a new insurance claim to cover the damage;
   determining, without the first homeowner submitting the new insurance claim, a potential impact of the new insurance claim on the home insurance policy of the first homeowner from historical home insurance claim data characterizing modifications to home insurance policies of the other homeowners as a result of the other homeowners' home insurance claim submissions, wherein the potential impact of the new insurance claim on the home insurance policy of the first homeowner includes a cancelation of the home insurance policy or an increase in an insurance premium associated with the home insurance policy; and
   generating, on a user interface, a recommendation to either submit the new insurance claim or to withhold submitting the new insurance claim based on the estimated cost and the potential impact, comprising:
      in response to a determination that the potential impact of the new insurance claim on the home insurance policy includes a cancelation of the home insurance policy,
         generating a recommendation to withhold submitting the new insurance claim, and
         providing, in the recommendation, a website link to a resource that has an instruction on how to repair the damage.

2. The system of claim 1, wherein the smart home device is installed at the home of the first homeowner.

3. The system of claim 1, wherein the smart home device includes a thermostat, a smoke detector, or a water sensor.

4. The system of claim 1, wherein the operations further comprise: receiving additional information about the damage from the first homeowner through a website or an application.

5. The system of claim 1, wherein the operations further comprise:
   retrieving a claim record of the first homeowner;
   wherein determining the potential impact of the new insurance claim on the home insurance policy is further based on the claim record; and
   wherein the operations further comprise providing the determined potential impact of the new insurance claim to the user interface of a device of the first homeowner.

6. A computer-implemented method comprising:
   receiving, from one or more sensors of a smart home device that have wireless communication capabilities, through a wireless communication network, an image associated with a home of a first homeowner;

processing, using a machine learning model that includes one or more neural network layers, the image to automatically detect at least one object in the image that indicates a damage to the home and to generate damage data that specifies a severity of the damage;

retrieving (i) a home insurance policy associated with the first homeowner and (ii) home insurance claims that were previously submitted by other homeowners;

automatically estimating, from the damage data, from the home insurance policy associated with the first homeowner, and from the home insurance claims submitted by other homeowners, a cost that the first homeowner would be required to pay upon submitting a new insurance claim to cover the damage;

determining, without the first homeowner submitting the new insurance claim, a potential impact of the new insurance claim on the home insurance policy of the first homeowner from historical home insurance claim data characterizing modifications to home insurance policies of the other homeowners as a result of the other homeowners' home insurance claim submissions, wherein the potential impact of the new insurance claim on the home insurance policy of the first homeowner includes a cancelation of the home insurance policy or an increase in an insurance premium associated with the home insurance policy; and generating, on a user interface, a recommendation to either submit the new insurance claim or to withhold submitting the new insurance claim based on the estimated cost and the potential impact, comprising:

in response to a determination that the potential impact of the new insurance claim on the home insurance policy includes a cancelation of the home insurance policy, generating a recommendation to withhold submitting the new insurance claim, and providing, in the recommendation, a website link to a resource that has an instruction on how to repair the damage.

7. The method of claim 6, wherein the smart home device is installed at the home of the first homeowner.

8. The method of claim 6, wherein the smart home device includes a thermostat, a smoke detector, or a water sensor.

9. The method of claim 6, wherein the method further includes: receiving additional information about the damage from the first homeowner through a website or an application.

10. The method of claim 6, further includes:

retrieving a claim record of the first homeowner;

wherein determining the potential impact of the new insurance claim on the home insurance policy is further based on the claim record; and wherein the method further includes providing the determined potential impact of the new insurance claim to the user interface of a device of the first homeowner.

11. The method of claim 6, wherein the recommendation further includes a list of contractors that the first homeowner may hire to repair the damage.

12. A non-transitory computer storage medium encoded with computer program instructions that when executed by one or more computers cause the one or more computers to perform operations comprising:

receiving, from one or more sensors of a smart home device that have wireless communication capabilities, through a wireless communication network, an image associated with a home of a first homeowner;

processing, using a machine learning model that includes one or more neural network layers, the image to automatically detect at least one object in the image that indicates a damage to the home and to generate damage data that specifies a severity of the damage;

retrieving (i) a home insurance policy associated with the first homeowner and (ii) home insurance claims that were previously submitted by other homeowners;

automatically estimating, from the damage data, from the home insurance policy associated with the first homeowner, and from the home insurance claims submitted by other homeowners, a cost that the first homeowner would be required to pay upon submitting a new insurance claim to cover the damage;

determining, without the first homeowner submitting the new insurance claim, a potential impact of the new insurance claim on the home insurance policy of the first homeowner from historical home insurance claim data characterizing modifications to home insurance policies of the other homeowners as a result of the other homeowners' home insurance claim submissions, wherein the potential impact of the new insurance claim on the home insurance policy of the first homeowner includes a cancelation of the home insurance policy or an increase in an insurance premium associated with the home insurance policy; and generating, on a user interface, a recommendation to either submit the new insurance claim or to withhold submitting the new insurance claim based on the estimated cost and the potential impact, comprising:

in response to a determination that the potential impact of the new insurance claim on the home insurance policy includes a cancelation of the home insurance policy, generating a recommendation to withhold submitting the new insurance claim, and providing, in the recommendation, a website link to a resource that has an instruction on how to repair the damage.

13. The non-transitory computer storage medium of claim 12, wherein the smart home device is installed at the home of the first homeowner.

14. The non-transitory computer storage medium of claim 12, wherein the smart home device includes a thermostat, a smoke detector, or a water sensor.

15. The non-transitory computer storage medium of claim 12, wherein the operations further comprise:

retrieving a claim record of the first homeowner;

wherein determining the potential impact of the new insurance claim on the home insurance policy is further based on the claim record; and wherein the operations further comprise providing the determined potential impact of the new insurance claim to the user interface of a device of the first homeowner.

16. The non-transitory computer storage medium of claim 12, wherein the recommendation further includes a list of contractors that the first homeowner may hire to repair the damage.

17. The system of claim 1, wherein the operations further comprise: estimating, from the damage data, from the home insurance policy associated with the first homeowner, and from the historical home insurance claim data, a repair cost that the first homeowner would be required to pay to repair the damage upon withholding the submission of the new insurance claim.

\* \* \* \* \*